United States Patent [19]

Smith, Jr.

[11] Patent Number: 4,583,485
[45] Date of Patent: Apr. 22, 1986

[54] APPARATUS FOR COATING A LIGHTGUIDE FIBER

[75] Inventor: James V. Smith, Jr., Decatur, Ga.

[73] Assignee: AT&T Technologies, Inc., Berkeley Heights, N.J.

[21] Appl. No.: 696,234

[22] Filed: Jan. 29, 1985

Related U.S. Application Data

[62] Division of Ser. No. 509,683, Jun. 30, 1983.

[51] Int. Cl.⁴ .............................................. B05C 3/15
[52] U.S. Cl. ...................................... 118/68; 118/69; 118/405
[58] Field of Search ...................... 118/69, 67, 404, 68, 118/405, 420; 427/163

[56] References Cited

U.S. PATENT DOCUMENTS

| | | | |
|---|---|---|---|
| 874,938 | 12/1907 | Cazen | 118/405 X |
| 2,313,296 | 3/1943 | Lamesch | 49/92 |
| 3,611,485 | 10/1971 | Leybourne et al. | 18/8 |
| 4,118,212 | 10/1978 | Aulich et al. | 65/3 A |
| 4,208,200 | 6/1980 | Claypoole et al. | 118/405 X |
| 4,217,123 | 8/1980 | Titmarsh | 65/3 A |
| 4,264,649 | 4/1981 | Claypoole et al. | 427/163 |
| 4,370,355 | 1/1983 | Niesse | 427/9 |
| 4,374,161 | 2/1983 | Geyling et al. | 427/160 |
| 4,388,093 | 6/1983 | Kimura et al. | 427/183 X |
| 4,409,263 | 10/1983 | Aloisio, Jr. et al. | 118/405 X |
| 4,410,567 | 10/1983 | France et al. | 427/163 |
| 4,437,870 | 3/1984 | Miller | 65/12 |
| 4,474,830 | 10/1984 | Taylor | 427/163 X |

OTHER PUBLICATIONS

Sato et al, "Double Layer Silicone Coating with Double Cone Nozzle In-Line with Optical Fiber Drawing", Optical Communications Conference, Sep., 1979, pp. 5.6-1 to 5.6-4.

Primary Examiner—John P. McIntosh
Attorney, Agent, or Firm—E. W. Somers

[57] ABSTRACT

A lightguide fiber (21) which has been drawn from a preform in a furnace (26) and which has a relatively high temperature is cooled prior to its movement through an apparatus (41) which applies a coating to its outer surface. The fiber is cooled by moving it through a liquid material (42) in a reservoir (40) which is interposed between the furnace and the coating apparatus. The liquid material in the reservoir (40) is the same as the coating material contained in the apparatus that is used subsequently to coat the fiber.

13 Claims, 6 Drawing Figures

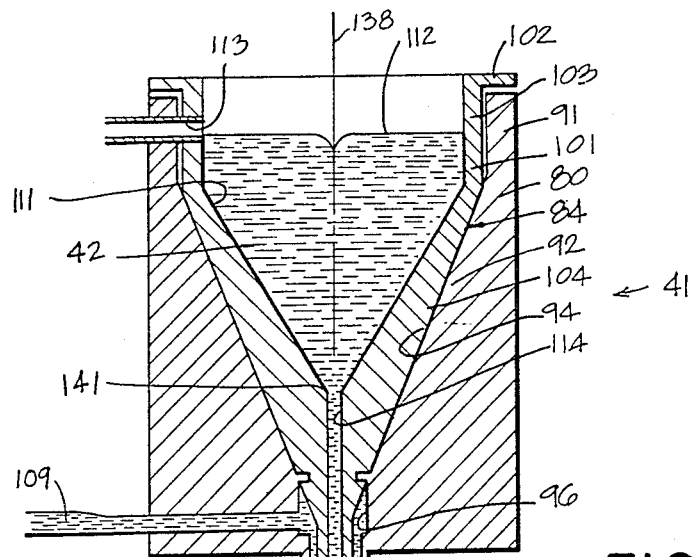
FIG. 4
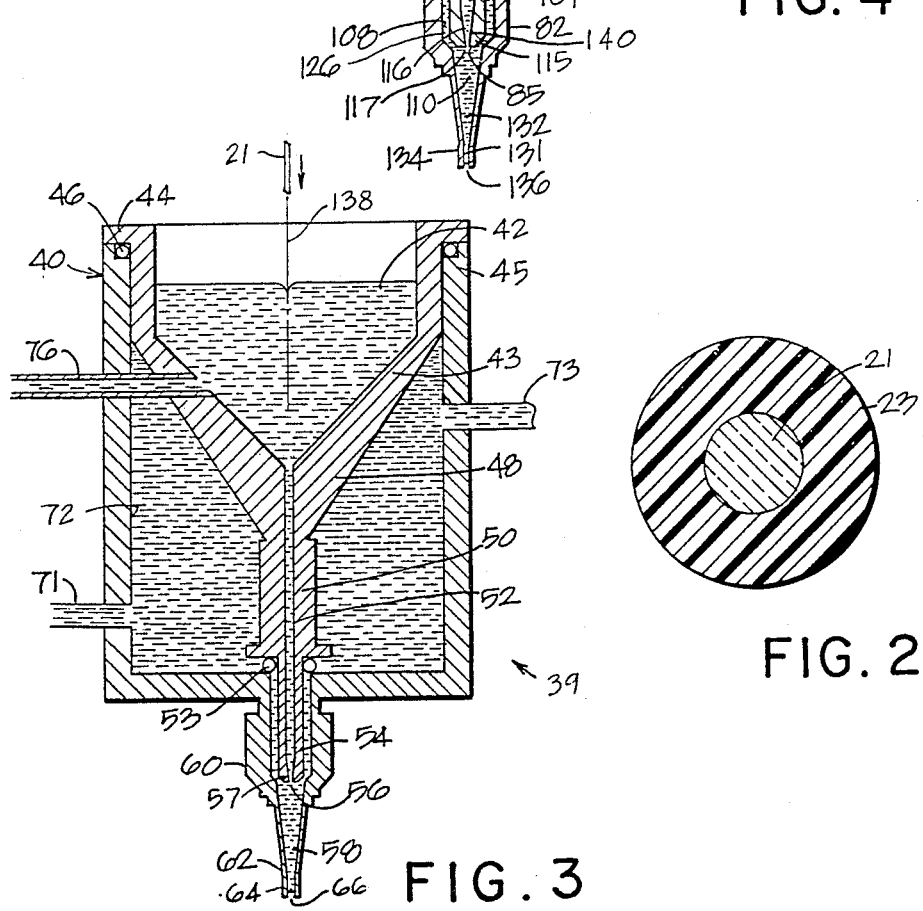
FIG. 2
FIG. 3

APPARATUS FOR COATING A LIGHTGUIDE FIBER

This is a division of application Ser. No. 509,683 filed June 30, 1983.

TECHNICAL FIELD

This invention relates to apparatus for coating elongated material. More particularly, it relates to apparatus for applying a layer of a coating material concentrically about a lightguide fiber which is drawn from a preform.

BACKGROUND OF THE INVENTION

The successful implementation of a lightwave communication system requires the manufacture of high quality lightguide fibers having mechanical properties sufficient to withstand stresses to which they are subjected. Each fiber which is made of glass must be capable over its entire length of withstanding stresses that it will encounter during installation and service. The importance of fiber strength becomes apparent when one considers that a single fiber failure will result in the loss of several hundred transmission circuits. The failure of lightguide fibers in tension is commonly associated with surface flaws which cause stress concentrations and lower the tensile strength from that of the pristine unflawed glass.

The potential strength of a lightguide fiber is realized only if it is protected with a relatively thin layer of a suitable coating material soon after it has been formed, such as by drawing it from a preform. This coating which has a thickness of about 0.005 cm serves to prevent airborne particles from impinging upon and adhering to the surface of the fiber which would serve to weaken it. Also, the coating shields the fiber from surface abrasion, which could be inflicted by subsequent manufacturing processes and handling during installation, provides protection from corrosive environments, and spaces the fibers in cable structures.

Important properties relating to the coating are its concentricity, and its thickness. An off-centered fiber in the coating may not adequately protect the fiber surface which could have an adverse effect on fiber strength and microbending loss. The coating must be thick enough to adequately cover and protect the surface of the fiber, but not so thick that it impairs subsequent manufacturing operations and/or connectorization.

In one process, the coating is applied by advancing the lightguide fiber through a reservoir of an open cup applicator containing a liquid polymeric material. Typically, the fiber enters the coating material through a free surface, and exits through a relatively small die orifice at the bottom of the reservoir.

Uniform wetting of the fiber during the coating process is largely affected by the behavior of an entrance meniscus which exists where the fiber is advanced through the free surface of the coating material in the reservoir. As is well known, the wetting characteristics of two materials such as a liquid coating material and glass, depend on surface tension and chemical bonds which are developed between the two materials.

The wetting characteristics are affected by a pumping of air into the meniscus. The fiber pulls a considerable amount of air into the coating material as it enters the free surface of the coating applicator. The entrance meniscus is drawn down with the moving fiber, instead of rising as it does under static conditions.

As the line speed is increased, the meniscus extends downwardly and develops into a long, thin column of air which surrounds the fiber and which is confined by surface tension in the coating material. The meniscus becomes unstable, oscillating between a fully developed state with circulation and a relatively small size with little or no circulation.

Should the column of air be caused to extend completely through the coating material to the die orifice, the meniscus collapses and the fiber no longer contacts the coating material. A meniscus may be reformed and the process of collapse repeated. If meniscus collapse has occured, the fiber may be coated but there is insufficient wetting to obtain a uniform covering of substantially the entire outer surface of the fiber. As a result, the strength and size of the fiber are adversely affected and the likelihood for damage and transmission losses is increased.

Meniscus collapse may be caused as a result of higher line speeds and the relatively high temperature of the fiber as it emerges from a drawing furnace. As the fiber is moved from the furnace into a reservoir of coating material, the air surrounding the fiber expands and prevents contact of the coating material with portions of the fiber. If the fiber is cooled sufficiently prior to its passage through the coating reservoir, meniscus collapse is avoided.

The prior art has addressed this problem. A solution is to space the coating applicator a sufficient distance from the drawing furnace so that the fiber is cooled by ambient air. Then when the fiber enters the coating applicator, it is sufficiently cool and meniscus collapse is avoided. In some instances however, it may not be feasible to increase the distance between the furnace and the coating applicator. Physical restrictions of the building in which fiber drawing apparatus is located may preclude the use of such a solution. Possibly, sufficient cooling time could be realized with the present arrangement by reducing line speed. Because meniscus collapse is affected by line speed as well as by the temperature of the fiber, a reduction in line speed is particularly helpful in decreasing the probability of meniscus collapse. However, from an economic standpoint, a decrease in line speed is not a desirable solution.

What is needed and what is not provided by the prior art is a coating arrangement in which the drawn fiber is provided with a coating having sufficient thickness without requiring undue space between the drawing furnace and the coating cup.

SUMMARY OF THE INVENTION

The foregoing problems have been overcome by the apparatus of this invention. In order to uniformly coat a lightguide fiber, the fiber which may be drawn from a glass preform in a furnace is advanced along a path of travel. After it leaves the furnace, the fiber is moved through a first reservoir of a liquid material. The first reservoir is interposed between the furnace and a second reservoir of a liquid coating material which causes a coating of the material to be applied to the fiber. The interposed reservoir holds a material which is identical to that which is applied subsequently as a coating to the fiber. Also, the coating material in the first reservoir is maintained at a temperature which is substantially less than the temperature of the fiber as it is formed. The temperature of the material in the interposed reservoir is sufficiently low to cool the fiber so that when it is advanced through the second reservoir, the coating material therein contacts and covers substantially the entire surface of the fiber.

In another embodiment, the apparatus of this invention is used to cool a fiber preparatory to its being advanced through apparatus which applies a dual coating to the fiber. The dual coating may comprise an inner layer of a relatively low modulus curable polymeric material and an outer layer of a relatively high modulus curable polymeric material. Prior to the application of the dual coating, the fiber is cooled by moving it through a reservoir which contains the same liquid material which is used to form the inner layer on the fiber. In an alternative embodiment, the cooling is supplemented by providing an entry die to the coating apparatus and by cooling that die to reduce the temperature of the lightguide fiber and its surrounding coating material.

BRIEF DESCRIPTION OF THE DRAWINGS

Other features of the present invention will be more readily understood from the following detailed description of specific embodiments thereof when read in conjunction with the accompanying drawings, in which:

FIG. 2 is an end cross-sectional view of a coated lightguide fiber;

FIG. 3 is an elevational view in section of facilities for cooling the drawn lightguide fiber;

FIG. 4 is an elevational view in section of an applicator for providing a coating about the drawn, cooled lightguide fiber;

DETAILED DESCRIPTION

Figure 1:
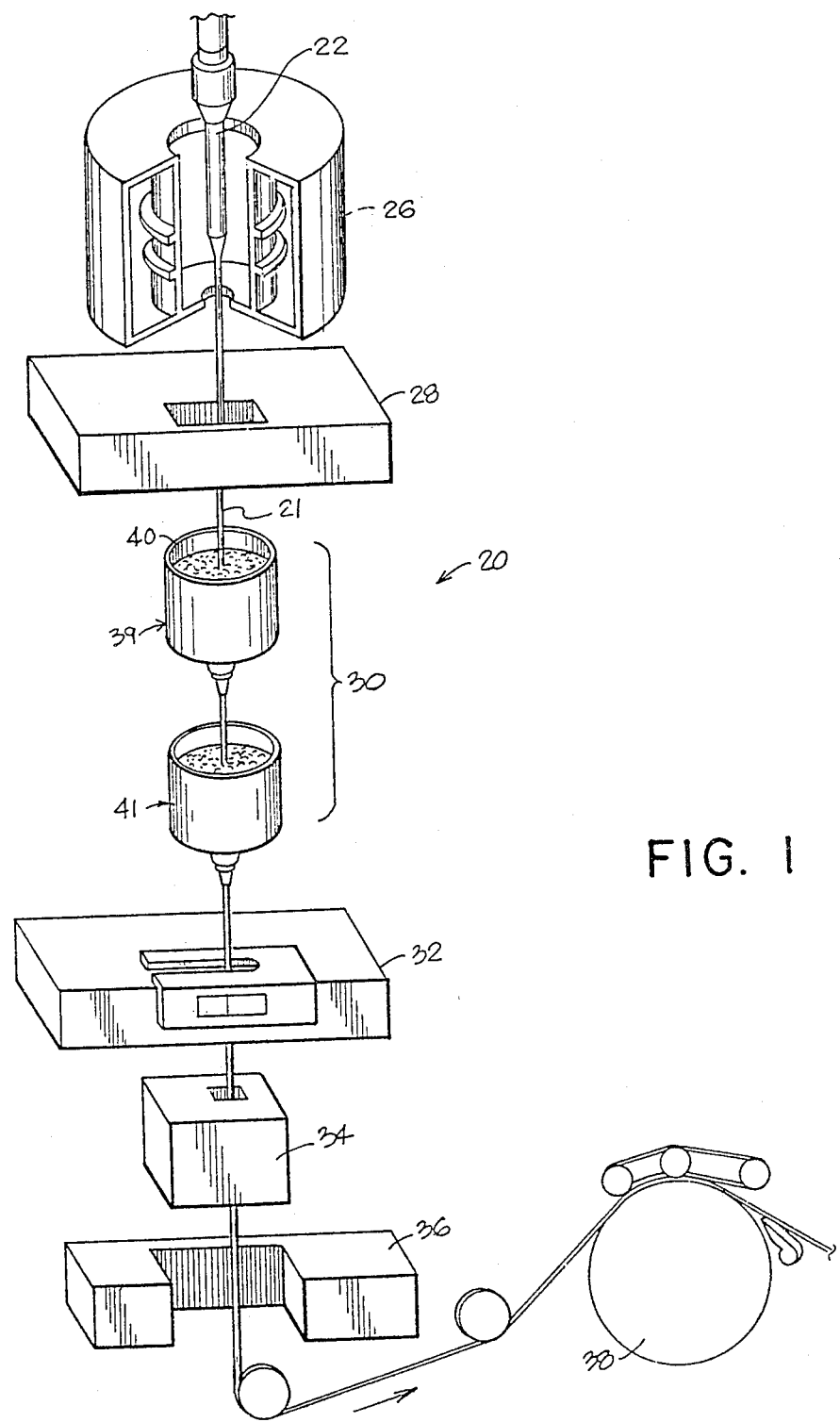
FIG. 1 is an overall perspective view of a portion of a line on which lightguide fiber is drawn from a preform and covered with a coating of a polymeric material.

Referring now to FIG. 1 there is shown an apparatus which is designated generally by numeral 20 and which is used to draw a lightguide fiber 21 having a diameter of about 0.012 cm from a specially prepared cylindrical preform 22 and to provide the fiber with a protective coating 23 (see FIG. 2). The preform is fed into and through a furnace 26 where it is heated to allow the fiber 21 to be drawn therefrom. The apparatus 20 also includes a device 28 for measuring the drawn fiber. After the fiber diameter is measured, the coating is applied by an apparatus 30. Then, after the coated fiber 21 passes through a centering gauge 32, a device 34 for treating the coating and a device 36 for measuring the outer diameter of the coated fiber, it is moved through a capstan 38 and is taken up.

The temperature inside the furnace 26 is about 2000° C. The temperature of the drawn fiber upon its exit from the furnace is about 1700° C. As was mentioned hereinbefore, the temperature of the fiber, if not reduced prior to entry into a coating applicator, causes meniscus collapse which results in a non-uniform coating.

The apparatus 30 overcomes this problem of meniscus collapse caused by the temperature of the fiber 21 without sacrificing line speed. It does so in one portion thereof by causing the temperature of the moving fiber 21 to be reduced substantially prior to its entry into another portion which applies a uniform coating thereto. Also, the apparatus 30 does not require substantial additional space and existing lines may be retrofitted with them. After the fiber has been cooled by a portion of the apparatus 30, it is moved through another portion which applies a uniform coating.

In a preferred embodiment, the apparatus 30 includes a cooling device 39. The cooling device 39 is the portion of the apparatus 30 which is effective to decrease substantially the temperature of the newly formed fiber 21. The device 39 includes a reservoir which is designated generally by numeral 40 (see FIGS. 1 and 3) and which is interposed between a coating applicator 41 for applying a single coating to the fiber 21 and the furnace 26.

The reservoir 40 is used to hold a liquid coating material 42 which is the same as the coating material in the coating applicator 41 and through which the lightguide fiber 21 is moved. An example of a coating material is a UV curable polymeric material. The reservoir 40 includes an inner vessel 43 which includes a flange 44 supported on an upper end of a wall 45 of the reservoir 40. The joint between the flange 44 and the upper end of the wall 45 is sealed with an O-ring 46.

The vessel 43 has a conically shaped intermediate portion 48 which terminates in a cylindrical portion 50. The cylindrical portion 50 and a portion of the conically shaped portion 48 include a vertically disposed passageway 52. Typically, the passageway 52 is slightly larger than the outside diameter of the lightguide fiber 21 being moved therethrough. A flanged lower end of the cylindrical portion 50 of the vessel 43 is sealed from a lower portion of the reservoir 40 by an O-ring 53.

From a lower end of the cylindrical portion 50 depends another cylindrical portion of a smaller diameter and designated 54. The passageway 52 through the conically shaped portion 48 and the cylindrically shaped portion 50 also extends through the portion 54 and terminates in an exit orifice 56 of a die 57. The die orifice 56 communicates with a chamber 58 formed in a lower end of a portion 60 having a flexible tip 62 depending therefrom. The tip 62 provides a second die 64 having an exit orifice 66.

As can be seen in FIG. 3, the wall of the reservoir 40 includes an inlet 71 through which chilled water is fed to fill a chamber 72 between the walls of the reservoir and the inner vessel 43. Chilled water at a temperature of about 25° C. is introduced through the inlet 71 and into the chamber 72 with an exit port 73 being provided to permit the water to be recirculated.

The coating material 42 extends from a free surface in the inner vessel 43 through the passageway 52 into the chamber 58. Inasmuch as the coating material 42 is moved along with the fiber 21 and through the elongated passageway 52 through the die 57 and into the chamber 58, a portion of the material is constantly being depleted from the reservoir. Accordingly, this material is replenished through a conduit 76 which communicates with a supply (not shown) of the coating material. The O-ring 53 prevents commingling of the cooling medium and the coating material 42.

The temperature of the liquid plastic material in the apparatus 40 is maintained within a range to ensure that sufficient heat energy is extracted from the moving fiber 21. This temperature is affected by line speed. For higher speeds, a lower temperature is used. For a preferred embodiment in which the line speed is in the range of 3 to 5 meters/second, the temperature of the coating material 42 in the reservoir 40 should not exceed a range of about 38°–43° C. and preferably should be ambient.

This invention overcomes the problem of meniscus collapse and incomplete coating. Coating instability occurs in the cooling device 39 but by the time the fiber has reached the coating applicator 41 it has cooled sufficiently to avoid instabilities. Meniscus collapse is avoided in the coating applicator. The hot air which surrounded the fiber 21 in the cooling reservoir 40 has been stripped away. A meniscus which is formed and which is helpful to the coating of the fiber is stable. As a result, the coating which is applied by the applicator 41 is substantially uniform over the entire surface of the fiber 21.

The applicator 41 is shown in detail in FIG. 4. It is disclosed and claimed in application Ser. No. 343,134 which was filed on Jan. 27, 1982 in the names of C. J. Aloisio et al, now U.S. Pat. No. 4,409,263 which issued Oct. 11, 1983, and which is incorporated by reference hereinto application Ser. No. 343,134 issued as U.S. Pat. No. 4,409,263 on Oct. 11, 1983.

As can be seen in FIG. 4, the applicator 41 for coating the drawn lightguide fiber 21 includes a housing 80 to provide a reservoir of the coating material 42 which is recirculated and replenished. The housing 80 includes a depending portion 82 and an insert 84. A lower end of the insert 84 includes a die 85, which is designated as the first die. The housing 80 includes a cylindrical wall section 91 which is joined to a diverging wall portion 92. The portion 92 provides a cavity 94 having a truncated conical shape which communicates with a lower portion 96 having a generally constant diameter.

The insert 84 includes an upper portion 101 having a flange 102 which is supported on the wall section 91. A constant diameter section 103 is received within the constant diameter section 91 of the housing and is joined to a conically shaped portion 104 having a wall thickness which increases in a downward direction. A lower end of the conically shaped portion 104 is connected to a constant diameter portion 107 which extends into a cylindrical cavity 108 of the depending portion 82.

The coating material 42 extends from a supply conduit 109 through a chamber 110 below the insert 84 and upwardly to a reservoir 111 formed by the insert. The coating material in the reservoir 111 has a free surface 112. An overflow opening 113 for the coating material is provided. The coating material 42 in the reservoir 111 has a temperature in the range of about 30°–40° C.

The chamber 110 communicates with the reservoir 111 through an elongated passageway 114 which extends through the constant diameter portion 107. The elongated passageway 114 has a diameter of about 0.30 cm and a length of about 4 cm. A land 115 of the die 85, which has a length of about 0.6 cm, is joined to the elongated passageway 114 through a tapered section 116. The land 115 includes an exit orifice 117 (see FIG. 4) which has a diameter of about 0.076 cm and which opens to the chamber 110. The cavity 108 and the constant diameter portion 107 provide a flow passage 126 of constant cross-section from the vicinity of the supply conduit 109 to the vicinity of the exit orifice 117 of the die 85.

The elongated passageway 114 and other portions of the die cavity of the first die may be considered as a "lubricated core tube" through which the fiber 21 is advanced. It is lubricated because unlike in the close fitting core tube of a conventional plastic extruder for copper wire, the coating material is flowing through it.

Because of its length, the passageway 114 supplements the cooling device 39 in preventing meniscus collapse.

A conically shaped second die 131 is connected to the depending portion 82. The second die 131 is made of a semi-rigid material such as fluorosilicone rubber, for example, and includes a cavity 132 having a truncated conical shape. The cavity 132 communicates through a land 134 with an exit orifice 136. The land 134 has a diameter of about 0.025 cm which is about the diameter of the coated fiber and a length of about 0.10 cm.

The coating material 42 is directed through the conduit 109 into the chamber 110 at sufficient positive pressure to cause a volumetric flow of the coating material upwardly through the first die 85 into the reservoir 111. A suitable pressure is in the range of about 40 newtons per square centimeter. As the fiber 21 is advanced, some of the coating material 42 is pulled downwardly through the first die 85 into the chamber 110.

The fiber 21 is advanced along a path of travel 138 at a velocity which causes air to become entrained in the in the coating material 42. For the coating applicator 41, there are two pressure gradients which contribute to the removal of bubbles from the fiber 21. One occurs between portions within the first die 85; the other between the chamber 110 and a point just prior to the orifice 136 of the second die 131. The advance of the fiber 21 causes a pressure gradient to be established along its path of travel between the free surface 112 and the first die 85 with the gradient being a maximum at the exit orifice 117. The pressure within the coating material 42 decreases abruptly from the exit orifice 117 of the first die 85 to an exit 140 of the cylindrical passageway 114, then gradually to an entrance 141 thereof and still further to the free surface 112. Following the exit orifice 117 of the first die 85, the pressure increase to a point in the vicinity of the second die 131. Afterwards, the pressure drops to zero at the exit orifice 136 of the second die 131.

The flowing of the pressurized coating material 42 into the chamber 110 enhances the first pressure gradient between portions of the first die 85. The enhanced pressure gradient between portions of the first die 85 cooperates with the volumetric flow of coating material upwardly to remove the air packets and any resulting bubbles from the advancing fiber 21. This causes air packets which have been carried along with the fiber 21 to bulge into a bubble shape and attach to recirculating streamlines. The gradient between a point within the chamber 110 and a point prior to the exit orifice 136 of the second die 131 is effective to strip any bubbles that may be in the chamber 110 between the dies 85 and 131.

Bubbles which are removed by the first die 85 and released into the streamlines are carried upwardly into the reservoir 111. The bubbles which are returned upwardly into the reservoir 111 coalesce, break apart or flow out of the applicator 41 through the opening 113. As a result, any coating material 42 in the chamber 110 is substantially bubble-free.

There is some tendency for the fiber 21 to be miscentered as it is moved through the first die 85. However, the pressure in the 0.076 cm first die 85 and the incoming coating material cooperate and act as a dampening agent to stabilize the fiber 21. Because of locating forces caused by the coating material in the first die 85, the vibrations caused by the coalesced large bubbles in the reservoir 111 are not seen in the final die 131. The net result is that the coating is substantially concentrically disposed about the fiber 21.

Figure 5:
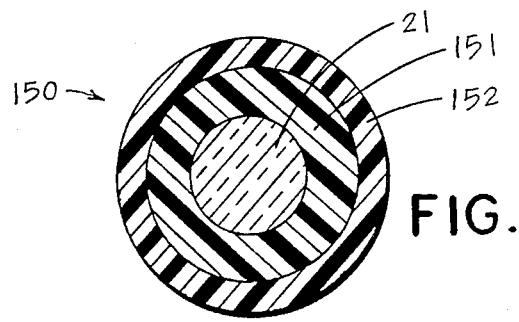
FIG. 5 is an end cross-sectional view of a dual coated lightguide fiber.

The methods and apparatus of this invention also are useful in a process in which two coatings are applied to the lightguide fiber 21 to provide the product shown in FIG. 5 and designated 150. Dual coated lightguide fibers are used to obtain design flexibility and improved performance. Typically, an inner or primary coating layer 151 that comprises a low-modulus material is applied over the fiber 21. Such a material reduces microbending losses associated with the cabling, installation, or environmental changes during the service life of the fiber. An outer or secondary coating layer 152 is applied to the primary layer. The outer layer 152 is usually a higher modulus material to provide abrasion resistance for the fiber 21 and the primary coating layer 151. See an article authored by M. Sato et al, and entitled "Double Layer Silicone Coating With Double Cone Nozzle In-Line with Optical Fiber Drawing," which appeared in the *Proceedings of the Fifth European Conference on Optical Communications*, pages 5.6-1 to 5.6-4 (Amsterdam, 1979).

Figure 6:
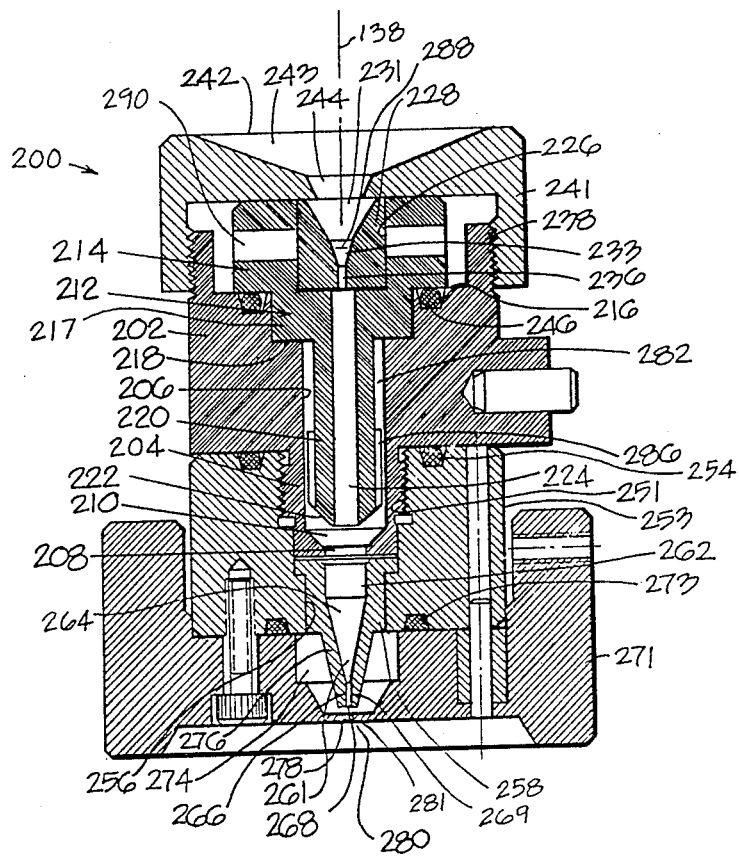
FIG. 6 is an elevational view of a portion of a lightguide fiber drawing line which shows facilities for applying dual coatings to the drawn fiber.

Although some coating materials which are used to form the inner layer 151 are not affected by the temperature of the drawn fiber and a continuous coating is achieved, others are and a sporadic coating ensues. Accordingly, when applying such a coating material which is so affected to a drawn fiber, it becomes advantageous first to cool the fiber 21 and then to move it through apparatus which applies the two coating layers. As is shown in FIG. 6, an apparatus designated generally by the numeral 200 for applying multiple coatings to the fiber 21 includes an upper housing 202 having a threaded portion 204 depending therefrom. The upper housing 202 includes a stepped cavity 206 which communicates with an exit passage 208 through a tapered bore 210.

Mounted within the cavity 206 of the upper housing 202 is a core tube 212. The core tube 212 has an enlarged end portion 214 which is supported on a step 216 of the housing 202, an intermediate portion 217 which is supported on a step 218 and an elongated portion 220. A tip 222 of the core tube is beveled and terminates at the beginning of the tapered bore 210. The core tube 212 also includes a passageway 224.

The enlarged and intermediate portions 214 and 217, respectively, have a cavity 226 formed therein for receiving an entry die 228 in a press fit. The entry die 228 includes a tapered entrance 231 which communicates through a tapered bore 233 and a land 236 with the passageway 224.

An upper end 238 of the upper housing 202 is threaded to receive a cap 241. The cap 241 includes an entrance 242 having a first frustoconical portion 243 and a second frustoconical portion 244. The second portion 244 communicates with the entrance 231 of the entry die 228. The cap 241 holds the assembly together by maintaining the enlarged end 214 in engagement with the step 216. An O-ring 246 provides a seal between the enlarged end 214 and the step 216.

The threaded portion 204 of the upper housing 202 is turned into a cavity 251 of a lower housing portion 253 with an O-ring 254 forming a seal therebetween. The lower housing 253 includes a stepped cavity 256 for holding a die insert 258. The die insert 258 is spaced slightly from a lower end of the threaded portion 204 and includes a passageway 261 therethrough. The passageway 261 includes an upper portion 262, a tapered portion 264 and a land 266 which terminates in an exit orifice 268 of a first die 269.

The lower housing 253 is fitted with an end cap 271. An O-ring 273 provides a seal between abutting surfaces of the lower housing 253 and the end cap 271. As can be seen in FIG. 6, the end cap 271 includes a cavity 274 into which extends a tapered portion 276 of the die insert 258. The cavity 274 communicates through a land 278 with an exit orifice 280 of a second die 281.

The apparatus 200 is used to apply the inner and outer coatings to a lightguide fiber 21 moved therethrough. A first liquid coating material which also fills the cooling device 39 and which is destined to form the inner layer 151 is supplied to a channel 282, a portion 286 of which is fluted. The first material which for coating one kind of fiber may be low modulus UV curable polymeric material fills the cavity 210 and the passageway 261. Further, it flows upwardly into the elongated passageway 224 and is maintained at a level designated 288 within the set point entry die 228. A second liquid coating material, which is used to provide the outer layer 152 for the fiber 21 is supplied to the cavity 274. The second coating material may be a higher modulus UV curable polymeric material.

The coatings which are applied to the lightguide fiber 21 should be bubble-free. Apparatus such as that disclosed in application Ser. No. 454,159 filed on Dec. 29, 1982 now, U.S. Pat. No. 4,474,830, in the name of C. R. Taylor provides such dual coatings. In the apparatus 200, this is accomplished by maintaining the first coating material at the predetermined level designated 288 in the entry die 228. Bubble free coatings also are achieved by maintaining the virgin coating material in a supply tank (not shown) free of bubbles.

The pressure of the first coating material is in the range of 30 to 70 psi. It is a function of the line speed and of the exit orifice of the entry die 228. As the fiber 21 is advanced through the apparatus 200, heat energy which has not been totally extracted from the fiber in the apparatus 30 causes the temperature of the first coating material to be increased. If this change is not addressed, it would cause the level 288 in the entry die 228 to rise and may result in bubbles in the coating. Accordingly, monitors (not shown) are used to detect the level of the first coating material above the elongated passageway 224. As the temperature of the first coating material increases and the level tends to rise, the detectors are effective to cause the pressure to be reduced. The results in the free surface of the coating material being maintained at the predetermnined level 288.

The die sizes are also important to the successful coating of substantially the entire surface of the moving fiber 21. The first die 269 should have an orifice diameter in the range of 0.023 to 0.025 cm and the entry die 228, an orifice of about 0.076 cm. The second die 281 should have an orifice size in the range of 0.037 to b 0.038 cm.

The relatively long passageway 224 is used to aid in developing the flow of the first coating material. The first coating material enters the channel 282 at about the fluted portion 286 of the core tube, is directed downwardly into the passage 208 and cavity 261 and upwardly into the elongated passageway 224. This provides time for the flow to develop into a balanced flow before contacting the fiber 21.

The size of the meniscus at the free surface in the entry die 228 is dependent on the geometry of the surrounding structure. The entry die 228 is helpful in preventing the formation of an overly large meniscus which would increase the probability of collapse. Its relatively small size prevents the formation of an overly large meniscus thereby decreasing the probability of meniscus collapse. Of course, if the drawn fiber had been cooled by the device 39, then notwithstanding the geometry of the die 228, the pressure could be high enough to trigger a meniscus collapse.

In an alternative embodiment, the entry die 228 may be cooled by introducing chilled water into passages 290—290 (see FIG. 6). This supplements the cooling device 39 and further decreases the temperature of the fiber 21 by conductive cooling.

It is to be understood that the above-described arrangement are simply illustrative of the invention. Other arrangements may be devised by those skilled in the art which will embody the principles of the invention and fall within the spirit and scope thereof.

What is claimed is:

1. An apparatus for uniformly coating a lightguide fiber, said apparatus including:
    means for providing a lightguide fiber which has a relatively high temperature;
    means for moving the fiber along a path of travel;
    coating means disposed along the path of travel for applying a liquid coating material to the lightguide fiber; and
    cooling means interposed between said means for providing a fiber and said coating means for reducing substantially the temperature of the lightguide fiber, said cooling means comprising;
    a housing having a depending portion, said depending portion including a die and a passageway which terminates in said die;
    an inner vessel which is mounted in said housing and which includes an upper portion and a lower portion which terminates in an orifice of a die and which extends into said passageway of said depending portion of said housing, said inner vessel including an elongated passageway which extends from said die of said inner vessel to a cavity formed in said upper portion, and said inner vessel cooperating with said housing to form a chamber which is capable of being filled with a cooling medium;
    means for supplying a cooling medium to said chamber; and
    means for providing to said cavity of said inner vessel a liquid material which is the same as the coating material that is applied by said coating means and which has a temperature that does not exceed a predetermined value.

2. The apparatus of claim 1, wherein said elongated passageway of said inner vessel has a diameter which is larger than that of said die of said inner vessel and which communicates with said die orifice through a tapered portion.

3. The apparatus of claim 1, wherein said die of said housing communicates with said die orifice of said inner vessel through a tapered portion.

4. The apparatus of claim 1, wherein said coating means includes means for applying two concentric coatings to the lightguide fiber, the two concentric coatings comprising an inner layer of a first polymeric material and an outer layer of a second polymeric material.

5. The apparatus of claim 4, wherein said coating means also comprises an entry die into which extends the first coating material, said entry die being maintained at a temperature which is effective to cool the fiber being advanced through the first coating material.

6. The apparatus of claim 4, wherein said coating means also includes an entry die and means for causing the first coating material to be maintained at a pressure which is in a predetermined range.

7. The apparatus of claim 6, wherein said means for causing the first coating material to have a pressure in a predetermined range causes the first coating material to have a free surface which is maintained at a predetermined level in said entry die.

8. The apparatus of claim 4, wherein said means for applying two concentric coatings to the lightguide fiber includes:
    an upper housing which includes a stepped cavity having an elongated portion and an enlarged portion;
    a core tube which is disposed within said upper housing, said core tube having an elongated portion which is disposed in said elongated portion of said stepped cavity and a base which is disposed in said enlarged portion of said stepped cavity, said core tube including a passageway which extends through said elongated portion thereof and through a portion of said base and which terminates in a cavity of said base;
    an entry die which is disposed in said cavity of said base of said core tube, said entry die having a passageway formed therethrough;
    a cap which is attached to an upper end of said upper housing, said cap having an opening which is aligned with said passageway of said entry die;
    a lower housing which is attached to a lower end of said upper housing and which includes a first exit die having a passageway which is aligned with said passageway through said core tube, said first exit die including a depending portion which includes a die orifice;
    a lower cap which is attached to a lower end of said lower housing and including a second exit die which is aligned with said first exit die, said lower cap including a cavity in which is disposed said depending portion of said first exit die;
    means for causing a first liquid coating material to be flowed into a lower end of said core tube, upwardly along said passageway of said core tube and to a predetermined level in said entry die; and
    means for causing a second liquid coating material to be flowed into the cavity in which is disposed said depending portion of said first exit die.

9. The apparatus of claim 8, wherein an inner surface of said upper housing and an outer surface of said core tube define a flow passage for the first coating material.

10. The apparatus of claim 9, wherein a portion of the outer surface of said core tube is fluted.

11. The apparatus of claim 8, wherein said passageway of said first exit die includes a truncated conically shaped portion which communicates with the orifice of said first exit die through a land.

12. The apparatus of claim 8, wherein said passageway through said elongated portion of said core tube has a constant diameter.

13. The apparatus of claim 12, wherein said passageway of said entry die includes an exit orifice which communicates through a land to a portion which converges toward said land, said exit orifice having a diameter which is smaller than that of said passageway of said core tube.

* * * * *